(12) United States Patent
Klinger (10) Patent No.: US 8,788,121 B2
(45) Date of Patent: Jul. 22, 2014

(54) AUTONOMOUS VEHICLE AND METHOD FOR COORDINATING THE PATHS OF MULTIPLE AUTONOMOUS VEHICLES

(75) Inventor: John Solomon Klinger, Washington Grove, MD (US)

(73) Assignee: Proxy Technologies, Inc., Reston, VA (US)

( * ) Notice: Subject to any disclaimer, the term of this patent is extended or adjusted under 35 U.S.C. 154(b) by 0 days.

(21) Appl. No.: 13/417,046

(22) Filed: Mar. 9, 2012

(65) Prior Publication Data

US 2013/0238170 A1 Sep. 12, 2013

(51) Int. Cl.
*G05D 1/00* (2006.01)
*G08G 5/00* (2006.01)
*G08G 1/00* (2006.01)

(52) U.S. Cl.
USPC ............................................................ 701/3

(58) Field of Classification Search
CPC ........................................................ G05D 1/00
USPC ......................................... 701/3, 4; 244/175
See application file for complete search history.

(56) References Cited

U.S. PATENT DOCUMENTS

| | | | |
|---|---|---|---|
| 6,246,932 B1 | 6/2001 | Kageyama et al. | |
| 6,292,725 B1 | 9/2001 | Kageyama et al. | |
| 6,625,540 B2 | 9/2003 | Kageyama | |
| 6,868,314 B1 | 3/2005 | Frink | |
| 7,283,893 B2 | 10/2007 | Hara et al. | |
| 7,343,222 B2 | 3/2008 | Solomon | |
| 7,451,023 B2 | 11/2008 | Appleby et al. | |
| 7,734,386 B2 | 6/2010 | DelNero et al. | |
| 2003/0060942 A1* | 3/2003 | Kotzev et al. | 701/3 |
| 2003/0093187 A1 | 5/2003 | Walker | |
| 2003/0191568 A1 | 10/2003 | Breed | |
| 2004/0030448 A1 | 2/2004 | Solomon | |
| 2005/0165516 A1* | 7/2005 | Haissig et al. | 701/4 |
| 2006/0095160 A1 | 5/2006 | Orita et al. | |
| 2007/0057113 A1* | 3/2007 | Parks | 244/12.5 |
| 2008/0243305 A1 | 10/2008 | Lee et al. | |
| 2009/0088916 A1 | 4/2009 | Elgersma et al. | |
| 2009/0138151 A1 | 5/2009 | Smid et al. | |
| 2010/0017046 A1 | 1/2010 | Cheung et al. | |
| 2010/0042269 A1* | 2/2010 | Kokkeby et al. | 701/3 |
| 2010/0094499 A1 | 4/2010 | Anderson | |
| 2010/0100269 A1 | 4/2010 | Ekhaguere et al. | |
| 2010/0106356 A1 | 4/2010 | Trepagnier et al. | |
| 2010/0114633 A1* | 5/2010 | Sislak et al. | 705/7 |

(Continued)

FOREIGN PATENT DOCUMENTS

CN 101122974 A 2/2008
KR 10-2008-0029679 A 4/2008

OTHER PUBLICATIONS

Office Action for U.S. Appl. No. 13/724,414, mailed Aug. 29, 2013.

(Continued)

*Primary Examiner* — John Q Nguyen
*Assistant Examiner* — Rodney P King (57) ABSTRACT

A method for coordinating the paths of multiple autonomous vehicles and a vehicle configured to coordinate its path with the path(s) of other vehicles so as to enhance cooperation between the vehicles. The method also enables the vehicles to perform their respective missions more efficiently. The method is applicable to any system in which multiple autonomous vehicles may need to coordinate their paths with each other.

18 Claims, 9 Drawing Sheets

(56) References Cited

U.S. PATENT DOCUMENTS

| | | |
|---|---|---|
| 2010/0131121 A1 | 5/2010 | Gerlock |
| 2010/0163621 A1* | 7/2010 | Ben-Asher et al. ........... 235/412 |
| 2010/0292871 A1 | 11/2010 | Schultz et al. |
| 2010/0324771 A1 | 12/2010 | Yabushita et al. |
| 2011/0082717 A1* | 4/2011 | Saad et al. ................... 705/7.13 |
| 2011/0112758 A1 | 5/2011 | D'Andrea et al. |
| 2011/0130954 A1 | 6/2011 | D'Andrea et al. |
| 2011/0135189 A1 | 6/2011 | Lee |
| 2011/0184604 A1 | 7/2011 | Franke et al. |

OTHER PUBLICATIONS

International Search Report and Written Opinion for International Application No. PCT/US13/29760, mailed May 13, 2013.

* cited by examiner

AUTONOMOUS VEHICLE AND METHOD FOR COORDINATING THE PATHS OF MULTIPLE AUTONOMOUS VEHICLES

FIELD OF THE INVENTION

The invention relates to a method for coordinating cooperating autonomous vehicles. The invention also relates to an autonomous vehicle configured to cooperate with other autonomous vehicles in a network of autonomous vehicles.

BACKGROUND OF THE INVENTION

As the use of autonomous vehicles such as unmanned aerial vehicles (UAVs), optionally piloted vehicles (OPVs), and robotic land and sea vehicles becomes prevalent, improved methods for coordinating their paths to allow them to cooperate in the performance of their specified tasks will be needed. Current methods for deconfliction and coordination of multiple vehicles require each vehicle to transmit its current position and velocity to the other vehicles in its area. Using this information, each vehicle can perform some limited functions for avoiding collision and coordinating their paths but cannot find optimal paths for achieving their goals via mutual cooperation.

Proxy Aviation Systems has been developing a control system, the Universal Distributed Management System (UDMS), which permits a single user to command, control, and monitor multiple autonomous vehicles (UAVs, OPVs, robotically controlled land and sea vehicles, etc.). In this system, each vehicle can communicate with each other and with control stations and each vehicle performs its assigned mission with a high degree of autonomy. In order to demonstrate this system, Proxy Aviation developed several scenarios where multiple UAVs must fly cooperatively to accomplish their missions. When multiple aircraft are flying close to each other, a collision is possible, so Proxy developed software that runs on each aircraft that detects whether a too close encounter is imminent and if so puts the aircraft into an avoidance maneuver until the danger of a collision had passed. This software prevented collisions but often also prevented each aircraft from executing its mission efficiently.

SUMMARY OF THE INVENTION

It is an object of the invention to provide a new method which permits the autonomous vehicle to cooperate and execute their missions efficiently. The invention is applicable to any system in which multiple autonomous vehicles may need to coordinate their paths with each other. An operator, who is receiving communications from a vehicle, is also able to see what the vehicle is planning to do, giving him valuable insight into the expected behavior of the vehicle.

The vehicles are assumed to be a part of a network and able to communicate with each other. Further, at least some of the vehicles are able to independently make decisions as to how to behave based on their assigned missions and the information they receive. Specifically, the invention enables multiple vehicles to work cooperatively to coordinate their paths, and to accomplish their missions with a minimum of interference. Each vehicle can construct its own planned path and then communicates that planned path to other vehicles in a network.

The method is used autarchically by the individual vehicles in the network and does not depend on any single entity in the network to gather information and make decisions as to how to coordinate the vehicles. The network can be a dynamic network where any vehicle or ground station may enter or leave the network or lose contact with the network while the method is carried out.

In using the method according to the invention, one or more vehicles in the network prepares its own planned path. The vehicle communicates its planned path to other vehicles. The vehicle controls its movement to travel the planned path it has generated for itself to the best of the vehicle's abilities. The vehicle can prepare planned paths at various points in its mission.

The vehicles can at certain times generate a replanned path. The replanned path can be generated periodically or in response to any number of events. Events which can cause the vehicle to replan its path can include but are not limited to: the vehicle nearing the end of its current planned path, the vehicle receives a planned path from a cooperating vehicle, the vehicle detects a close encounter with another vehicle or with an object which is deemed to be too close, a vehicle or ground station joins the network, a vehicle or ground station loses contact with the network or loses contact with the network, the mission requirements change, certain mission requirements have been achieved, and a change in hierarchy or roles of the vehicles. A vehicle may receive a planned path from another participating vehicle and can, for example, modify its own planned path so as to avoid a collision or enhance cooperation with the other vehicles. Thus, the method enables the vehicles to consider the planned paths of the other cooperating vehicles in order to optimize their paths.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
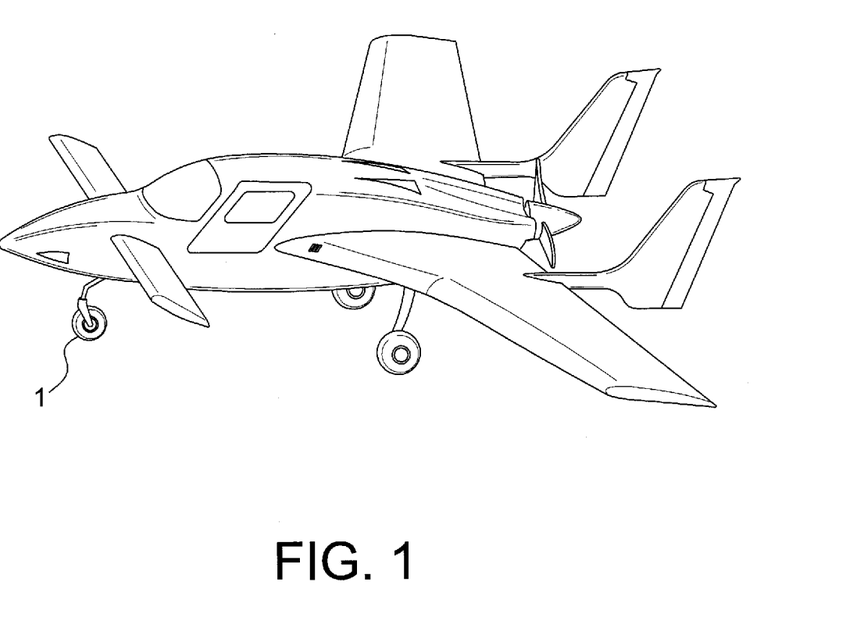
FIG. 1 shows an example embodiment of an autonomous vehicle as an unmanned aerial vehicle.

FIG. 1 shows an optionally piloted vehicle, which can be flown by a pilot or as an UAV, as an example for an autonomous vehicle 1. The vehicle 1 can, for example, also be a surface vehicle such as an all terrain vehicle, a boat, a tank and so forth or any other type of autonomous vehicle. A group of cooperating autonomous vehicles can also have vehicles of different types cooperate with each other.

Figure 2:
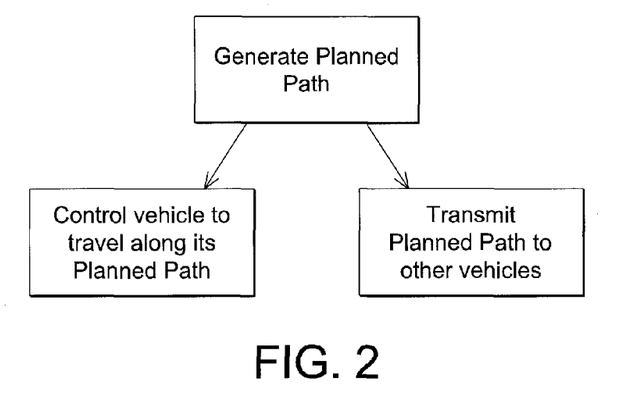
FIG. 2 is a flow chart showing the sequence of steps of a method of the invention for coordinating autonomous vehicles wherein each cooperating vehicle is provided with a set of mission requirements.

FIG. 2 is a flow chart which shows an example embodiment of the method according to the invention. According to the invention, each vehicle generates its own planned path. In order to generate its planned path, the vehicle may use any of a plurality of parameters. Where the vehicle has received planned path data from another cooperating vehicle, it can use that data as a parameter in generating its own planned path. Other examples of parameters include the current location of the vehicle, the velocity of the vehicle, the mission requirements provided to the vehicle, map or topographical data and the like.

As FIG. 2 shows, the vehicle can transmit its planned path data to other cooperating vehicles. This can enable another vehicle to consider the planned path when it is generating its own planned path to, for example, enhance cooperation and avoid too close encounters or collisions. When the vehicle has autarchically generated its own planned path, the vehicle travels along the path to the best of its abilities.

Figure 3:
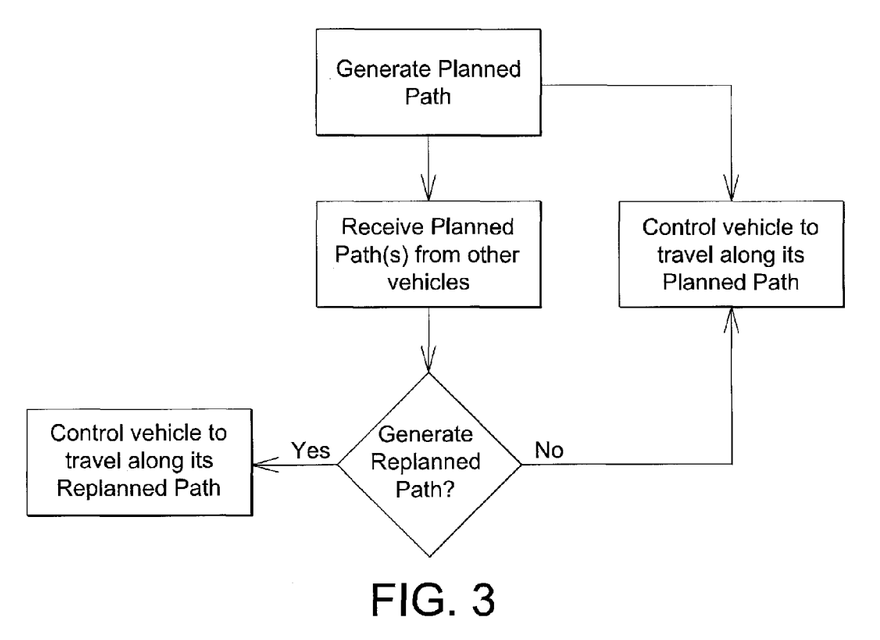
FIG. 3 is a flow chart showing the method of FIG. 2 wherein there is a return to the first method step in a selected one of the autonomous vehicles in response to replanning events.
Figure 4:
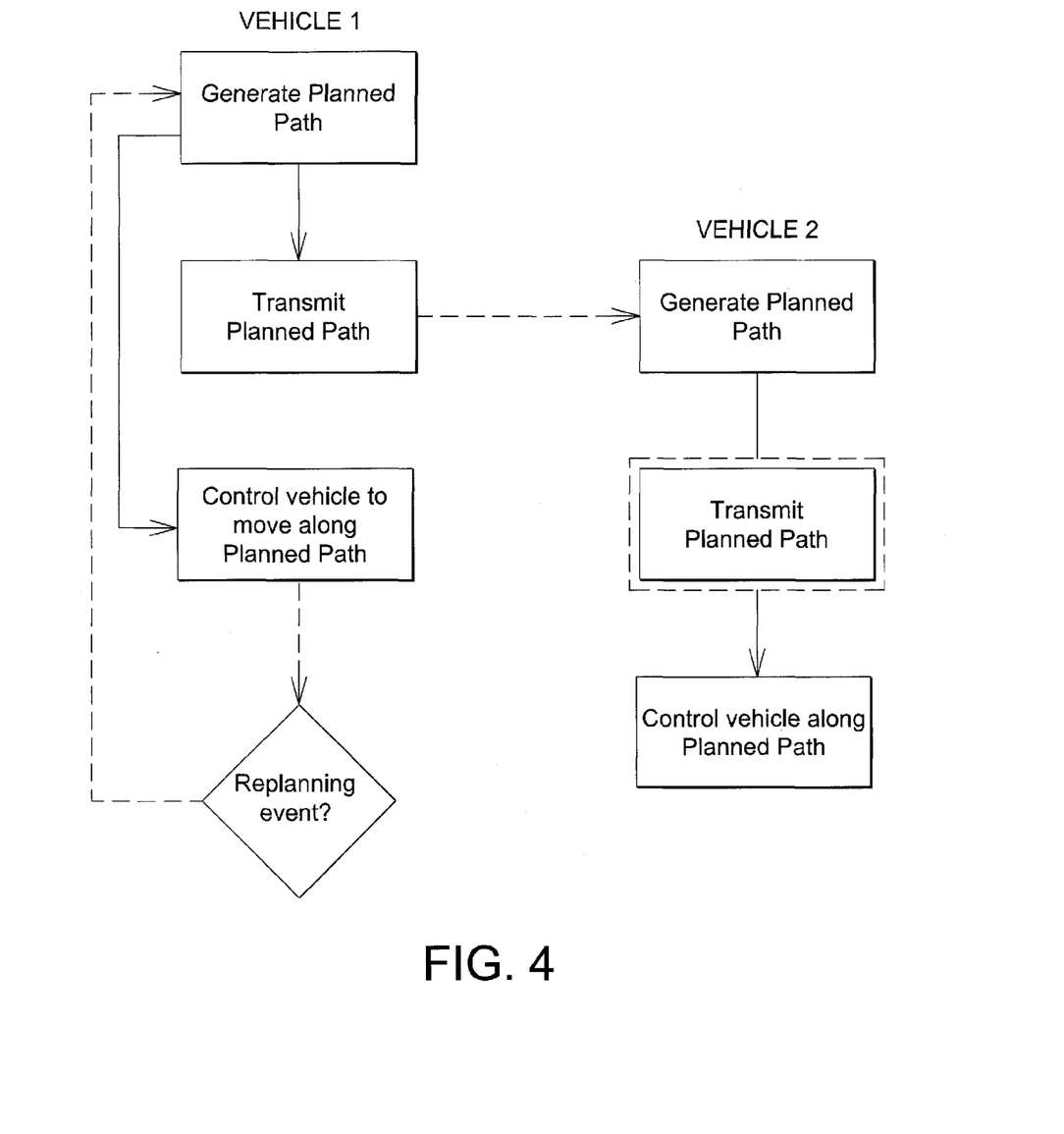
FIG. 4 is a flow chart showing the method as shown in FIG. 3 supplemented by specific replanning events.

As shown in FIG. 3, there may be events or situations where the vehicle would generate a new planned path. For example, wind, other environmental factors or equipment failure may cause the vehicle to be off its planned path. That is the vehicle is prevented from behaving as planned. In this situation, the vehicle may generate a new planned path or replanned path so as to more effectively accomplish the mission requirements and/or enhance cooperation between the cooperating vehicles. Where the vehicle receives a planned path from another vehicle it can, for example, in the interest of improving cooperation and/or more effectively and efficiently achieving the mission requirements, generate a new planned path in order to enhance cooperation. A further instance where it may be beneficial for the vehicle to recalculate its planned path is where there is a change in mission requirements or certain mission objectives have been accomplished or have become moot. Additional examples of events which may cause the vehicle to generate a new planned path are: the vehicle is close to the end of its current path, the vehicle detects a too close encounter or possible collision with another vehicle, the vehicle's teaming relationship with other cooperating vehicles in the network has changed, and where the vehicle is in a teaming relationship with other vehicles in the network where it is not the team leader and the team leader has generated a new planned path for itself.

Figure 5:
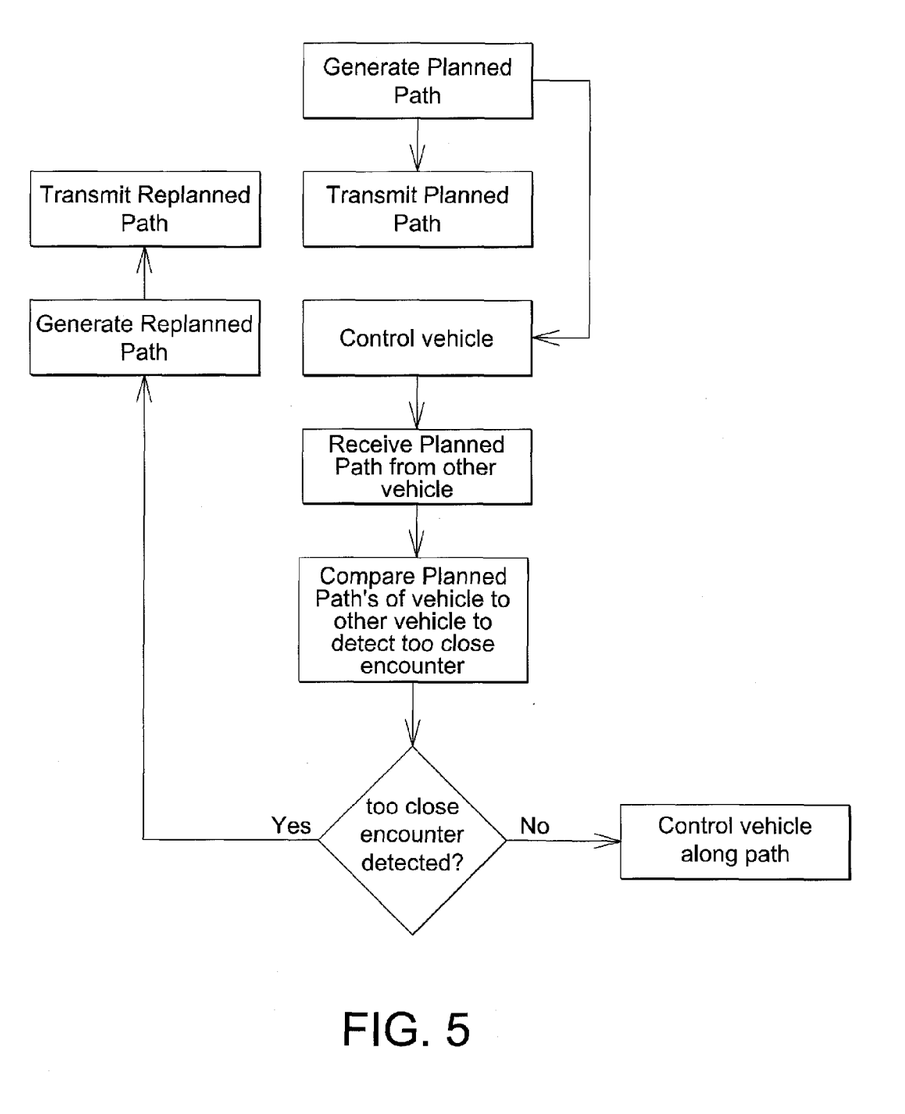
FIG. 5 is a flow chart showing the method of FIG. 2 wherein a too close encounter is detected.

Equipped with the knowledge of its own planned path and the planned path data reported by other vehicles in the network, each vehicle can determine whether a too close encounter will occur several minutes before the encounter. As shown in FIG. 5, after generating its own planned path, a vehicle can, for example, compare its planned path to the planned paths of other vehicles in order to determine whether a too close encounter is going to or likely to occur. If the vehicle does not detect a too close encounter, it will continue to travel along its planned path. If, on the other hand, a too close encounter is detected, a corrective action can be taken which is not disruptive to the missions of the vehicles involved. Only one vehicle may need to adjust its planned path and the automatic method can try different path adjustments to see if it succeeds in avoiding a collision with the other vehicle. The vehicle will make adjustments which are least disruptive to performing its current mission first. For example, a UAV might select from the following types of adjustments:

1. a temporary speed adjustment;
2. a temporary altitude adjustment; and,
3. an evasive horizontal profile adjustment that returns to the original planned path.

This does not necessarily replace emergency avoidance methods which command evasive actions when a collision in the near future is detected but this method can prevent such disruptive emergency avoidance actions from occurring.

In order to optimize cooperation between the vehicles, the planned path data includes sufficient data for a recipient of the planned path data to determine the expected future position of the vehicle that transmitted the planned path data at any given time within a specified time frame. As an example embodiment of the data, which enables the determination of the expected future position of, for example, a fixed wing aircraft which flies like a commercial aircraft, can include:

(a) the absolute time at the start of the planned path;
(b) the flight time specified by the path;
(c) data to determine the speed profile of the path
   (i) an array of values of the horizontal component of the ground speed at an increasing sequence of times in the path. The first time is at the start of the path and the last time is at the end of the path. The value at any time in the path is the interpolated value at the surrounding data times specified. This data allows one to calculate the expected horizontal distance in the path at any time in the path.
(d) data to determine the altitude profile of the path.
   (i) the initial altitude of the path. (AMSL)
   (ii) the climb slope used for climb maneuvers.
   (iii) the descent slope used for descent maneuvers.
   (iv) an array of desired altitudes specified at an increasing set of horizontal distances in the path starting at 0.
The aircraft altitude at any horizontal distance into the path can be determined using the above data.
(e) data to determine the horizontal (i.e. top view) profile of the path.
   (i) an array of horizontal path segments which can be arc segments or straight line segments which connect smoothly (i.e. each segment's end location and bearing is equal to the next, segment's start location and bearing). The arc segments are used to specify turns and are limited by a minimum allowed value for the planned turn radius based on the aircraft's expected ground speed and the maximum roll angle used for the aircraft.
The aircraft's horizontal location (i.e. its latitude and longitude) at any horizontal distance in the path can be determined using this data.

According to the invention, a sequence of waypoints, even where times of arrival at each waypoint is specified, would not provide sufficient information to define the planned path unless there was an understanding as to how to determine the position of the vehicle at any given time between the waypoints. For vehicles that are moving quickly, how the vehicle behaves as it changes direction should be specified since such vehicles cannot change direction abruptly and the resulting deviations from the point-to-point path can not be ignored when such vehicles are attempting to act cooperatively.

The vehicle generates its own planned path given its current location and velocity as well as the requirements of its mission. The control system on the vehicle can generate planned paths for various mission requirements. For example, if the planned path information specification were described in the example data structure described above in relation to the example embodiment of a fixed wing aircraft, the control system or planned path generator would generate the horizontal profile of the planned path, that is the array of smoothly connected horizontal path segments, and the altitude and speed profiles of the planned path to meet the current mission requirements. A simple and common mission requirement for such an aircraft is to fly an orbit path around a target. Planned path segments which start at the aircraft's current location and bearing and then merge continuously into the orbit pattern would be generated. The turn segments in this ingress path would have a turn radius no smaller than a predetermined minimum value. The planning method generates an optimal set of path ingress segments that meet these specifications.

Figure 6:
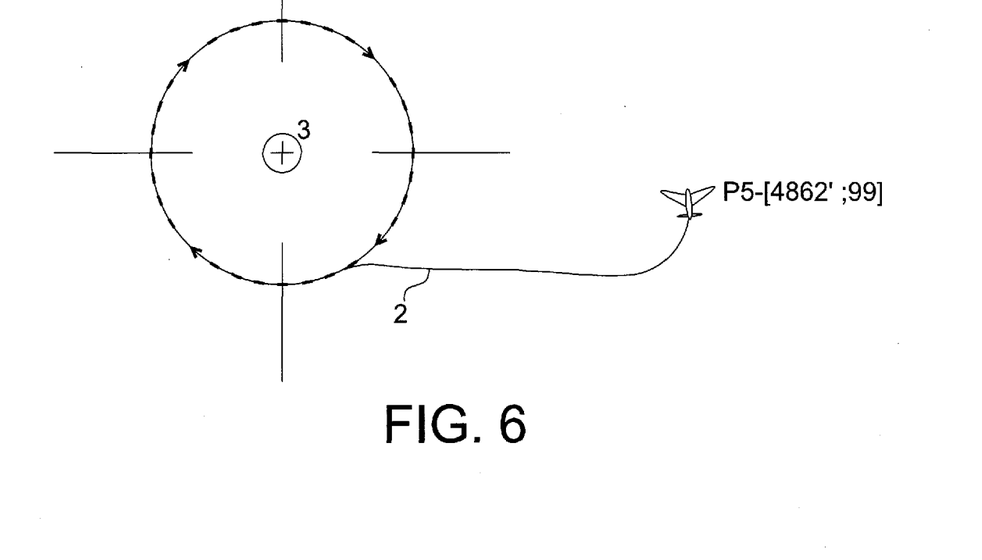
FIG. 6 shows a top view of a planned path for an aircraft orbiting a target.

FIG. 6 shows an example of a planned path 2 of the kind described by way of example above. FIG. 6 shows an aircraft 1 with example altitude and velocity values whose mission requirements include orbiting an object 3. The top view shown in FIG. 6 illustrates the horizontal profile of an aircraft's 1 planned path 2. The aircraft's 1 current altitude and velocity values are also shown in FIG. 6 adjacent to the current location of the aircraft 1.

Figure 7:
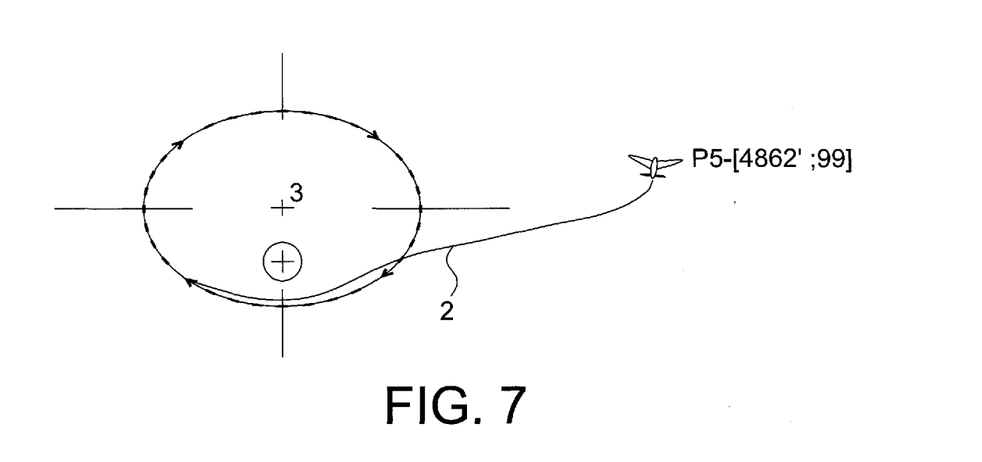
FIG. 7 shows an oblique view of a planned path for an aircraft orbiting a target where a descent is planned.

FIG. 7 shows an oblique view of a planned path 2 of an aircraft 1 with example altitude and velocity values. The oblique view of FIG. 7 shows that the planned path 2 of the aircraft 1 includes a descent and, thus, provides for an altitude profile in its planned path.

Other vehicles receiving a planned path from another vehicle in the network can use the received planned path when they calculate their own path. The exchanging of detailed planned path data enables the vehicles to cooperate more effectively. When a vehicle receives a planned path update from another vehicle, it may decide to recalculate its own planned path to enhance cooperation with the vehicle that sent the planned path update as well as other vehicles in the network. Rules can be used to determine whether a vehicle needs to replan its planned path on the basis of the received planned path so as to avoid the possibility of this process repeating indefinitely. For example, the vehicles can be assigned different ranks in the network. In this case a rule where a vehicle would not replan its path after receiving a new planned path from a lower ranked vehicle could be used.

The method according to the invention provides significant advantages when working in conjunction with a mechanism for determining whether a vehicle is teaming with other vehicles while performing its mission. A team is defined as an ordered subset of the vehicles in the network where the first vehicle is the team leader. In the method according to the invention, the teaming mechanism would be a method that would allow each vehicle to determine whether it should be teaming with other vehicles and if so what its position or role in the team should be.

The teaming relationships as determined by each vehicle can change many times during its mission. Each vehicle determines that it has entered or left a team based on what it is currently doing and based on the data it receives from other vehicles in the network. When such a teaming mechanism is present, there can be rules for determining planned paths for vehicles in a team. For a UAV, for example, this may mean following behind the leader at a given range based on its position in the team in an orbit path around a target but the details depend on the vehicles involved and the requirements of the mission. This permits planning of paths which facilitate more effective teaming with other vehicles since each vehicle receives the detailed planned paths from its other team members. Typically, the planning will evaluate a set of possible planned paths and select one that optimizes the way the path works together with the planned path of the leader based on the member's position in the team.

Figure 8:
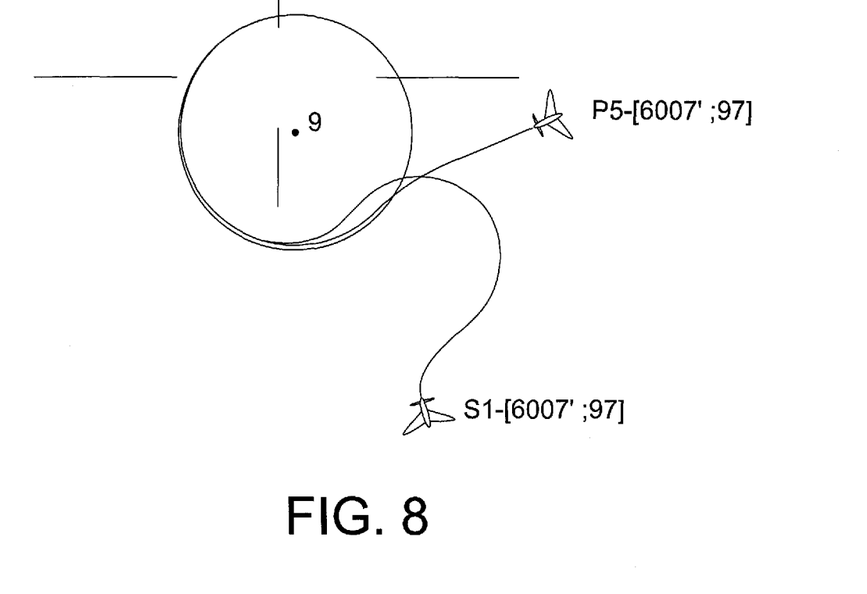
FIG. 8 shows the planned paths of two aircraft tasked with orbiting a target.
Figure 9:
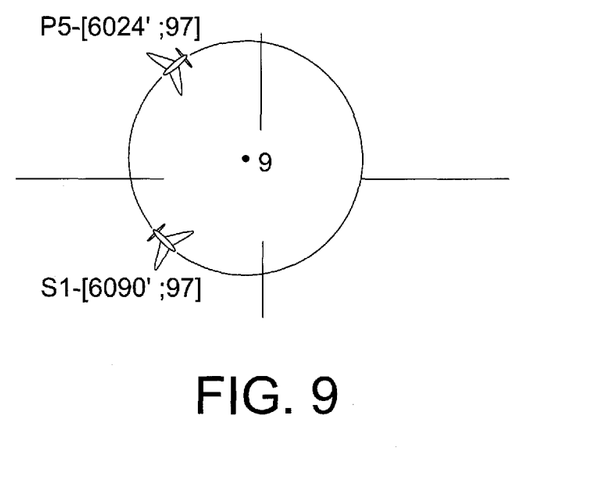
FIG. 9 shows the two aircraft of FIG. 8 on their orbiting path.

FIG. 8 shows an example of two aircraft cooperating in orbiting a target 9. In this example, the aircraft are trying to locate the position of a device near the target 9 that occasionally emits some radiation. Each aircraft has a sensor capable of detecting this radiation and determining the direction that it is coming from. The aircraft will get the most precise location information if they receive the signal from locations that are at directions from the device that differ by 90 degrees. In the example, aircraft S1 plans its path to fly behind the team leader P5 and to be 90 degrees behind P5 when it reaches the target orbit circle. FIG. 9 shows the two aircraft after they are both in the specified orbit circle.

The method according to the invention can support a dynamic process. In the example according to FIGS. 8 and 9, if the target 9 location changes, the vehicles orbiting the target 9 would replan their paths and when a team member receives a new planned path from its leader it would replan again.

Figure 10:
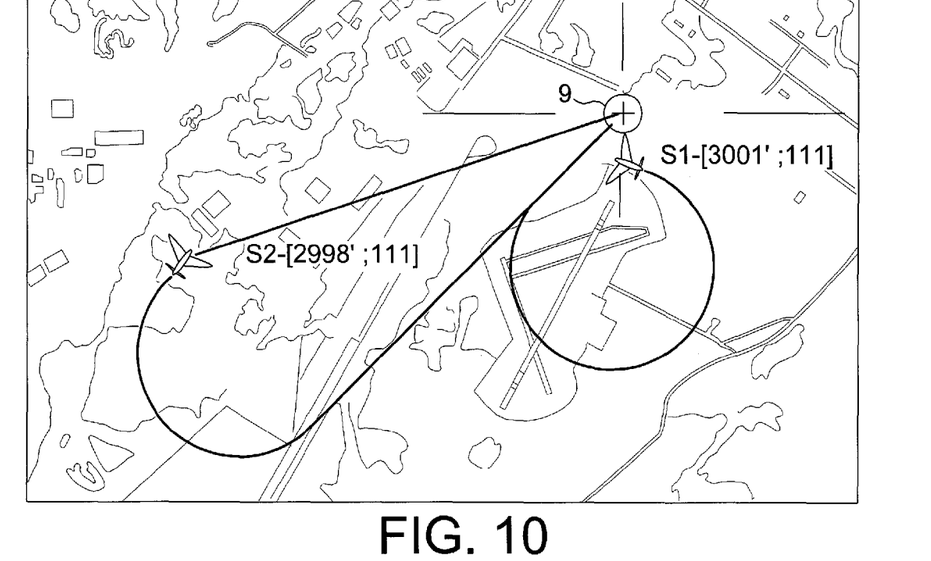
FIG. 10 shows two aircraft planning a cooperative attack profile on a target.
Figure 11:
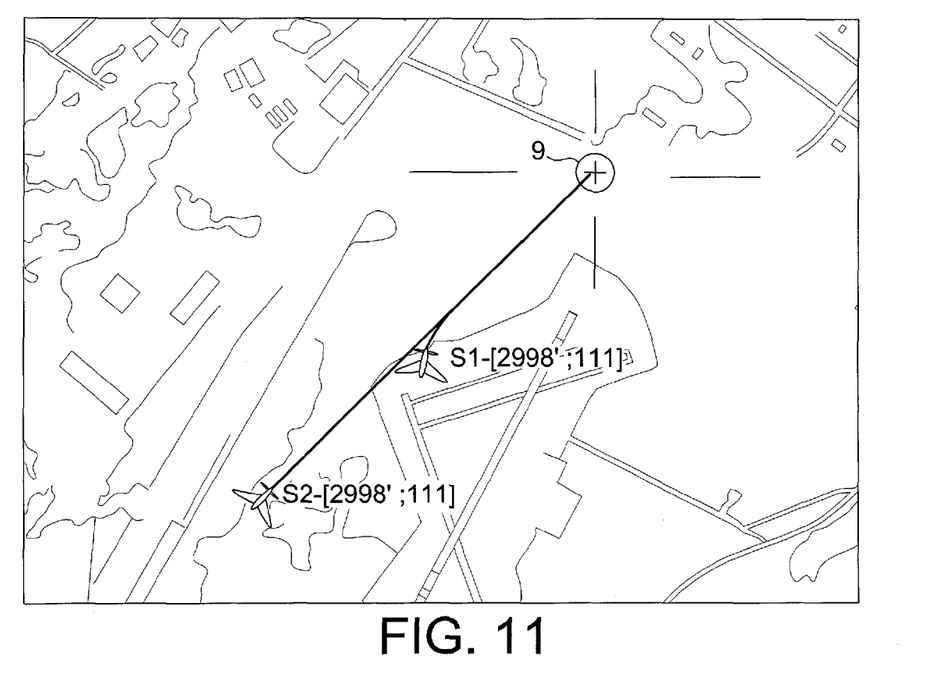
FIG. 11 shows the two aircraft of FIG. 10 in their proper position prior to weapon release.

FIG. 10 shows an example of two aircraft cooperating to attack a target 9. Aircraft S2 is tasked to provide laser designation for a weapon to be released by aircraft S1. In this example, aircraft S1 plans its attack profile and aircraft S2 uses a "cooperative flight" method to calculate its "planned path" based on the "planned path" data that it receives from S1. This method finds an optimal path that puts S2 in the proper position to perform its task at the time of release of the weapon. In FIG. 11, the two aircraft have reached their proper positions prior to release of the weapon. S1 receives the planned path data from S2 but as the team leader, S1 would not replan its path whenever it receives a new planned path from S2. But S1 would use the planned path data it receives from S2 in order to decide whether it can leave a pre-attack hold pattern and start the attack profile, and at the time of weapon release, whether S2 is in position and S1 can release its weapon.

Figure 12:
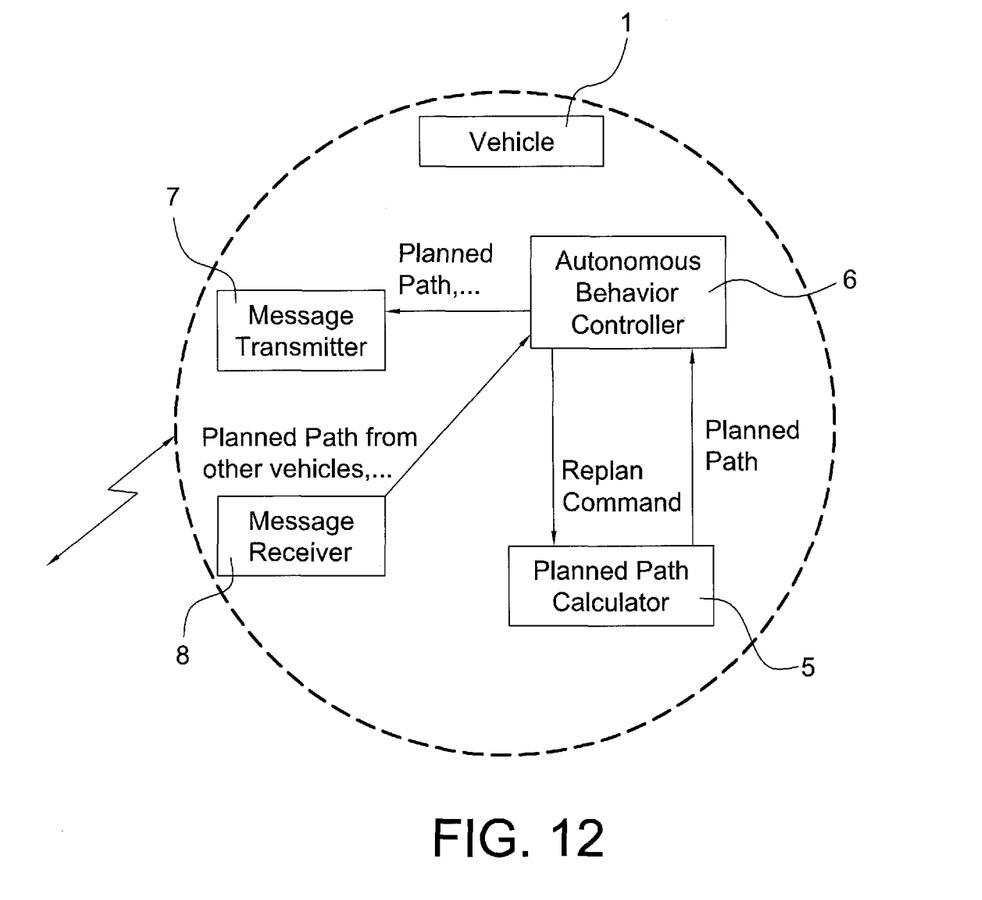
FIG. 12 is a block diagram showing components of an autonomous vehicle configured to cooperate with other autonomous vehicles; and, FIG. 13 shows a network of vehicles and control stations.

FIG. 12 shows the components of a vehicle 1 configured to cooperate with other vehicles in a network. The vehicle 1 has a device (not shown) to determine the current location. The message receiver 8 can receive planned path data from other vehicles. The vehicle 1 has a planned path calculator 5 which generates a planned path for the vehicle 1. The planned path of the vehicle 1 can be based on any number of parameters. These parameters include but are not limited to the current location of the vehicle 1, the requirements of the mission provided to the vehicle 1, current speed of the vehicle 1, environmental factors, and planned path data received from other vehicles. The message transmitter 7 transmits the planned path the vehicle 1 has autarchically generated for itself to other vehicles in the network. The vehicle 1 further has an autonomous behavior controller 6 which controls the vehicle 1 so that it follows the planned path it has generated for itself. The planned path calculator 5 may periodically generate a new planned path for the vehicle or generate a new or replanned path in response to certain events. These events include but are not limited to receiving a planned path from another vehicle, vehicle 1 is nearing the end of its current planned path, vehicle 1 has deviated from its planned path, there is a change in mission requirements, certain mission objectives have been accomplished, a new cooperating vehicle joins the network, a cooperating vehicle leaves the network, another cooperating is impaired in its ability to perform the mission, and vehicle 1 detects an encounter with another vehicle or object which is too close.

Figure 13:
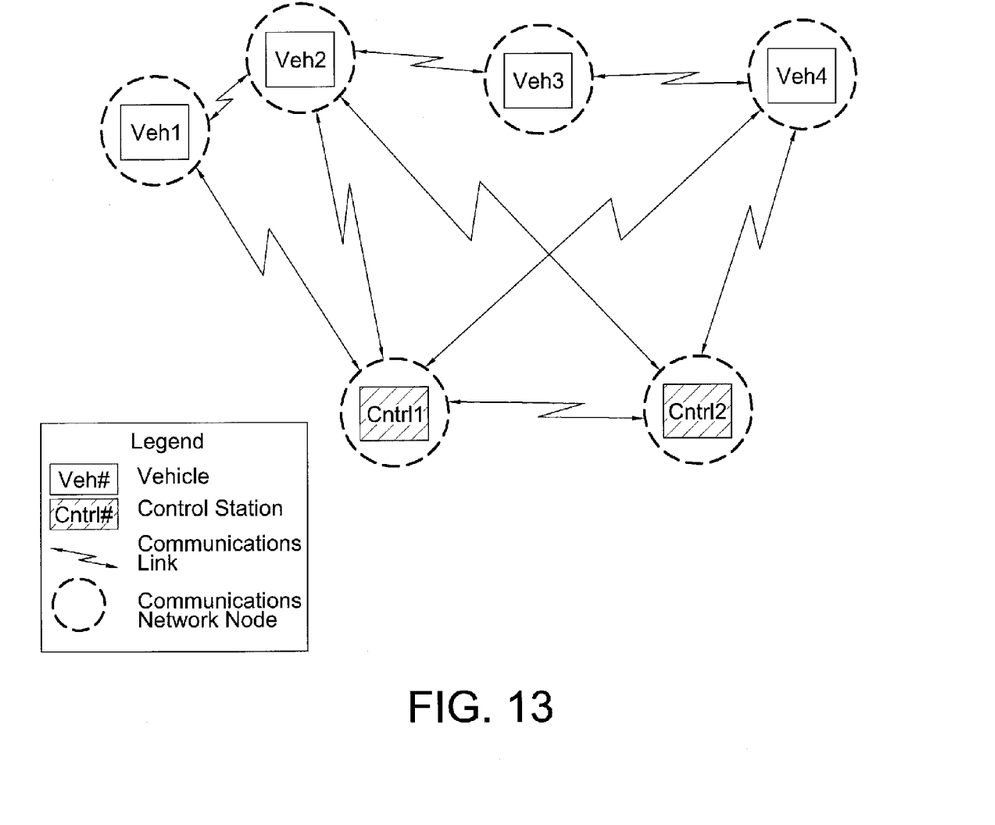

FIG. 13 shows an example embodiment of a network which contains both vehicles and control stations participating in the network. FIG. 13 shows the communications network nodes of the participants and communications links between the participants.

The method according to the invention may be practiced in an environment where the communications between the vehicles may be spotty and there may be a limited bandwidth for these communications. Based on these limitations, a rule can be implemented which defines if a vehicle's planned path data would need to be retransmitted to other cooperating vehicles. For example, a vehicle could retransmit its planned path data at regular intervals to compensate for the possibility that the original message was lost.

The method and vehicle according to the invention are useful in any scenario where multiple autonomous vehicles are tasked with cooperating in order to accomplish a mission. Some examples of actions where the method and vehicle according to the invention can be used are:

Vehicles working together to locate a target or search an area or road.
A vehicle tasked to support another vehicle in its mission:
  Provide laser designation for an attack mission.
  Provide jamming or other countermeasure for another vehicle.
  Provide a communications link for another vehicle.
A UAV tasked to support a ground vehicle:
  Provide air support for a convoy.
  Provide intelligence for a ground vehicle.
  Provide a communications link for a ground vehicle.
A UAV tasked to support a sea vehicle:
  Provide intelligence for a sea vehicle.
  Provide a communications link for a sea vehicle.

The objects in a network of vehicles and control stations, as described above, are defined as "Participants". This methodology applies to the following types of participants:
  a. Moving fully autonomously—entirely self directed
  b. Moving partially autonomously
    Self directed with some human input
    Self directed after inputting an initial movement plan
    Any combination of the above. Self directed with some human input that may be in the form of general movement plan. Self directed after inputting an initial movement plan and then with some human input that changes the plan by cancelling it, modifying it, or replacing it with another movement plan.
  c. Moving under human control
  d. Not moving The method according to the invention can apply to participants that may vary their status over time. That is, for example, a participant can be moving fully autonomously for some period of time and then be moving fully under human control for another period time. Similarly, a participant may be moving for some period of time and then not moving for another period of time. In general, this methodology applies to a group of participants, each of which may at any time change their status between any of those listed above.

The method according to the invention applies to broad sets of operational scenarios of participants cooperatively coordinating their movements. Three examples of categories of scenarios and the desired goals (sensor utilization, weapon utilization, and safety) that the method according to the invention can be applied to are described below. This can also be applied to any combination of scenario categories.

a. Sensor Utilization
  Sensor data is any data that in some way provides, information about an environment (e.g. picture images). Sensor data can be data provided directly from a sensor or data from one or more sensors that has been processed by a "sensor data processor" into a more refined and/or useful form.
  The sources of sensor data can be any one or more of the following:
    i. One or more sensors that are part of a cooperating vehicle, either attached or an integral part of the participant.
    ii. One or more sensors that are external to a participant, either a part of another participant or completely separate from any of the participants.
    iii. One or more sensor data processors that are part of a participant, either attached or an integral part of the participant.
    iv. One or more sensor data processors that are external to a participant, either a part of another participant or completely separate from any of the participants.
  There are many cases of sensor utilization for which method according to the invention can be applied. Below are just two examples:
    Using multiple sensors on different cooperating participants to more quickly and accurately triangulate the location a signal source.
    Using multiple sensors on different cooperating participants to view something more effectively by simultaneously observing from different view points.

b. Weapon Utilization
  A weapon can be part of a participant, either attached or an integral part of the participant. A weapon can also be external to a participant, either a part of another participant or completely separate from any of the cooperating vehicles.
  There are many cases of weapon utilization in which the above claim applies. Below are just two examples:
    Having one cooperating participant deliver a laser guided weapon where the target is being designated by the same cooperating participant, another cooperating participant, or by something external to the participant group.
    Two or more cooperating participants coordinate the delivery of multiple weapons in some fashion (e.g. by time of delivery, by direction of delivery, by location of delivery, etc.).

c. Safety
  The method according to the invention can also be applied to systems that enhance the safety of operation of participants. Safety of operation means the safe operation of the participant so that the chances of its operation causing damage or injury are reduced or eliminated. Safety of operation also means the safe operation of things external to the vehicle implementing the method according to the invention so that the chances of their operation causing damage or injury are reduced or eliminated.
  There are many cases of safety improvement in which the above applies. Below are just two examples:
    Using the planned path of an unmanned participant, a manned participant can steer his participant to avoid the unmanned participant.
    Sharing planned paths between two different autonomous cooperating participants, each participant's autonomous control can ensure that each participant can avoid the other.

It is understood that the foregoing description is that of the preferred embodiments of the invention and that various changes and modifications may be made thereto without departing from the spirit and scope of the invention as defined in the appended claims.

What is claimed is:

1. A method, comprising:
generating, at a first autonomous vehicle, a first planned path from at least a current position of the first autonomous vehicle to a destination, the first planned path being based, at least in part, on the current position of the first autonomous vehicle and a mission requirement assigned to the first autonomous vehicle to be performed at the destination;
receiving, at the first autonomous vehicle, from a second autonomous vehicle, a first planned path associated with the second autonomous vehicle, the first planned path associated with the second autonomous vehicle being from at least a current position of the second autonomous vehicle to the destination and being based, at least in part, on the current position of the second autonomous vehicle and a mission requirement assigned to the second autonomous vehicle to be performed at the destination;
after the receiving, generating, at the first autonomous vehicle, a second planned path to the destination based, at least in part, on the first planned path associated with the second autonomous vehicle and the mission requirement assigned to the first autonomous vehicle;
transmitting the second planned path of the first autonomous vehicle from the first autonomous vehicle to the second autonomous vehicle; and
receiving, at the first autonomous vehicle, from the second autonomous vehicle, a second planned path associated with the second autonomous vehicle to the destination such that the first autonomous vehicle performs the mission requirement assigned to the first autonomous vehicle at the destination while the second autonomous vehicle performs the mission requirement assigned to the second autonomous vehicle at the destination, the second planned path associated with the second autonomous vehicle differing from the first planned path associated with the second autonomous vehicle.

2. The method of claim 1, wherein the mission requirement assigned to the first autonomous vehicle is a first mission requirement, the method further comprising:
receiving, at the first autonomous vehicle, a second mission requirement assigned to the first autonomous vehicle to replace the first mission requirement; and
generating, at the first autonomous vehicle, a third planned path based, at least in part, on the current position of the first autonomous vehicle and the second mission requirement.

3. The method of claim 1, further comprising:
determining, at the first autonomous vehicle, a future position of the first autonomous vehicle along the second planned path of the first autonomous vehicle; and
when the future position of the first autonomous vehicle is within a predetermined distance of a future position of the second autonomous vehicle along the second planned path associated with the second autonomous vehicle during a future period of time, generating a third planned path for the first autonomous vehicle to avoid a close encounter with the second autonomous vehicle during the future period of time, the third planned path of the first autonomous vehicle not placing the first autonomous vehicle within the predetermined distance of the future position of the second autonomous vehicle at any point along the third planned path of the first autonomous vehicle.

4. The method of claim 1, further comprising:
receiving, at the first autonomous vehicle, from a third autonomous vehicle, a planned path associated with the third autonomous vehicle,
the generating the second planned path including generating the second planned path of the first autonomous vehicle based, at least in part, on the first planned path associated with the second autonomous vehicle, the planned path associated with the third autonomous vehicle, and at least one of the mission requirement assigned to the first autonomous vehicle or the first planned path of the first autonomous vehicle.

5. The method of claim 1, further comprising:
receiving, at the first autonomous vehicle, from the second autonomous vehicle, a third planned path associated with the second autonomous vehicle when the second autonomous vehicle is unable to follow the second planned path due to at least one of an environmental factor or an equipment failure associated with the second autonomous vehicle;
generating, at the first autonomous vehicle, a third planned path based on the third planned path associated with the second autonomous vehicle and at least one of the mission requirement assigned to the first autonomous vehicle or the second planned path of the first autonomous vehicle; and
transmitting the third planned path from the first autonomous vehicle to the second autonomous vehicle.

6. The method of claim 1, wherein the second planned path associated with the second autonomous vehicle differs from the first planned path associated with the second autonomous vehicle based, at least in part, on the second planned path of the first autonomous vehicle.

7. The method of claim 1, wherein the second planned path of the first autonomous vehicle incorporates at least one of an evasive horizontal profile, a temporary altitude adjustment, or a temporary speed adjustment into the first planned path.

8. The method of claim 1, wherein the generating the second planned path of the first autonomous vehicle avoids a projected collision with the second autonomous vehicle at a future location along the first planned path.

9. The method of claim 1, wherein the mission requirement assigned to the first autonomous vehicle includes at least one of an instruction to orbit around a location of a target, an instruction to attack a target, or an instruction to provide laser designation of a target.

10. The method of claim 1, further comprising retransmitting data associated with the second planned path of the first autonomous vehicle to compensate for the possibility that the data associated with the second planned path of the first autonomous vehicle transmitted in the transmitting the second planned path was not received by the second autonomous vehicle.

11. The method of claim 1, further comprising:
controlling a movement of the first autonomous vehicle such that the first autonomous vehicle follows the first planned path, the controlling being autarchically performed by the first autonomous vehicle.

12. The method of claim 1, wherein the mission requirement assigned to the second autonomous vehicle includes at least one of an instruction to provide jamming measures in a target area, an instruction to provide air support, an instruction to provide a communications link, an instruction to provide intelligence for one or more autonomous vehicles, an instruction to locate an object, or an instruction to monitor a target area.

13. The method of claim 1, wherein the first autonomous vehicle is one of an unmanned aerial vehicle, an optionally piloted vehicle, a surface vehicle or a sea vehicle.

14. The method of claim 1, wherein the mission requirement assigned to the first autonomous vehicle is different from the mission requirement assigned to the second autonomous vehicle.

15. The method of claim 1, wherein the first planned path of the first autonomous vehicle includes a sequence of smoothly connecting arc segments and line segments.

16. The method of claim 1, wherein the generating, at the first autonomous vehicle, the first planned path includes generating, at the first autonomous vehicle, the first planned path such that the first planned path associated with the first autonomous vehicle is devoid of waypoints.

17. The method of claim 1, wherein the generating, at the first autonomous vehicle, the second planned path includes generating, at the first autonomous vehicle, the second planned path such that the second planned path associated with the first autonomous vehicle is devoid of waypoints.

18. The method of claim 1, wherein the first autonomous vehicle has a first rank, the second autonomous vehicle having a second rank, the first rank being higher than the second rank.

\* \* \* \* \*